Nov. 29, 1966 D. N. HUTCHINSON 3,288,929

TRANSMISSION LINE BREAK DETECTING CIRCUIT

Original Filed May 16, 1963 2 Sheets-Sheet 1

*INVENTOR*
DAVID N. HUTCHINSON
AGENT
Curphey & Erickson

Nov. 29, 1966 D. N. HUTCHINSON 3,288,929

TRANSMISSION LINE BREAK DETECTING CIRCUIT

Original Filed May 16, 1963 2 Sheets-Sheet 2

INVENTOR
DAVID N. HUTCHINSON

AGENT
Curphey & Erickson 3,288,929

TRANSMISSION LINE BREAK DETECTING CIRCUIT

David Norman Hutchinson, Dorval, Quebec, Canada, assignor, by mesne assignments, to The Bell Telephone Company of Canada Continuation of application Ser. No. 280,845, May 16, 1963. This application June 21, 1965, Ser. No. 465,610
5 Claims. (Cl. 178—69)

My invention is a transmission line break detecting circuit which is particularly suited for use with teleprinter and other electrical data transmission systems. This application is a continuation of my copending application, Serial No. 280,845 filed May 16, 1963, now abandoned.

In many teleprinter systems, information is transmitted by alternately open circuiting and short circuiting the transmission line. Connections are arranged so that pulses, represented by a "no current" condition, travel from the transmitter to the receiver. In the idle condition, and no pulse condition, current flows in the transmission line.

In the prior art, it was the practice to connect a slow acting relay, in series with the transmission line, which did not respond to the pulses of "no current" but did respond to a prolonged "no current" condition to operate on alarm. But by its very nature, the slow acting relay did not respond to short breaks in the transmission line: and these short breaks caused errors at the receiver. The errors were caused during periods of current flow: the inadvertent break in the line appeared as a "no current" pulse to the receiver although the transmitter had not sent any pulses. My invention responds to very short breaks in the transmission line and may be connected to operate an alarm, or stop transmission as desired.

My invention is a transmission line break detecting circuit wherein a signal generator responds to a data source to generate electrical signals representing the data. The electrical signals are transmitted to a transmission line by a transmitter which is connected to the signal generator. A comparator is connected both to the signal generator and to the transmission line and is arranged to compare the electrical signals in both and to generate an output signal if the electrical signals are different when no current is flowing in the transmission line.

The invention may be fully understood by reference to the drawings.

The same reference numerals are used on both figures for the same parts.

Figure 1:
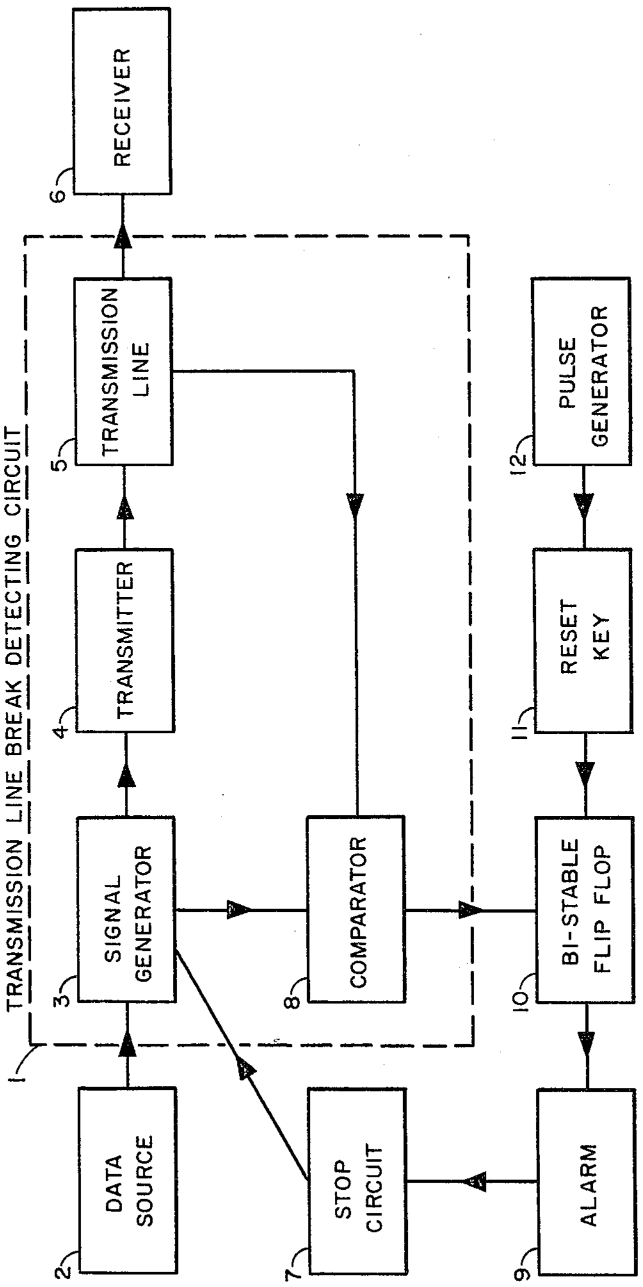
FIG. 1 is a block schematic of my transmission line break detecting circuit.

Referring now to FIG. 1, the signal generator 3, responsive to a data source 2 generates electrical signals representing the data. The transmitter 4 is connected to the signal generator 3 and transmits the electrical signals to the transmission line 5. A receiver 6 is connected to the distant end of the transmission line 5.

The comparator 8 is connected to the signal generator 3 and also to the transmission line 5: it compares the electrical signals from the signal generator 3 and from the transmission line 5 and is arranged to generate an output signal when the electrical signals differ in the idle, or no pulse condition. Normally, they will not differ: however, if a break occurs in the transmission line 5 when the signal generator 3 generates an idle signal, no current flows in the transmission line 5. In this case, the comparator 8 generates an output signal. The comparator output signal triggers the conventional bistable flip-flop 10 to its alarm state which activates the alarm 9. The alarm 9 is arranged to stop the signal generator 3 by operation of the stop circuit 7. The stop circuit 7 may be any convenient conventional device to stop the signal generator 3.

After the break in the transmission line 5 has been cleared, a pulse from the pulse generator 12 is applied by the reset key 11 to trigger the bistable flip-flop to its normal state. This will deactivate the alarm 9, and the stop circuit 7, allowing the signal generator 3 to resume operation.

Figure 2:
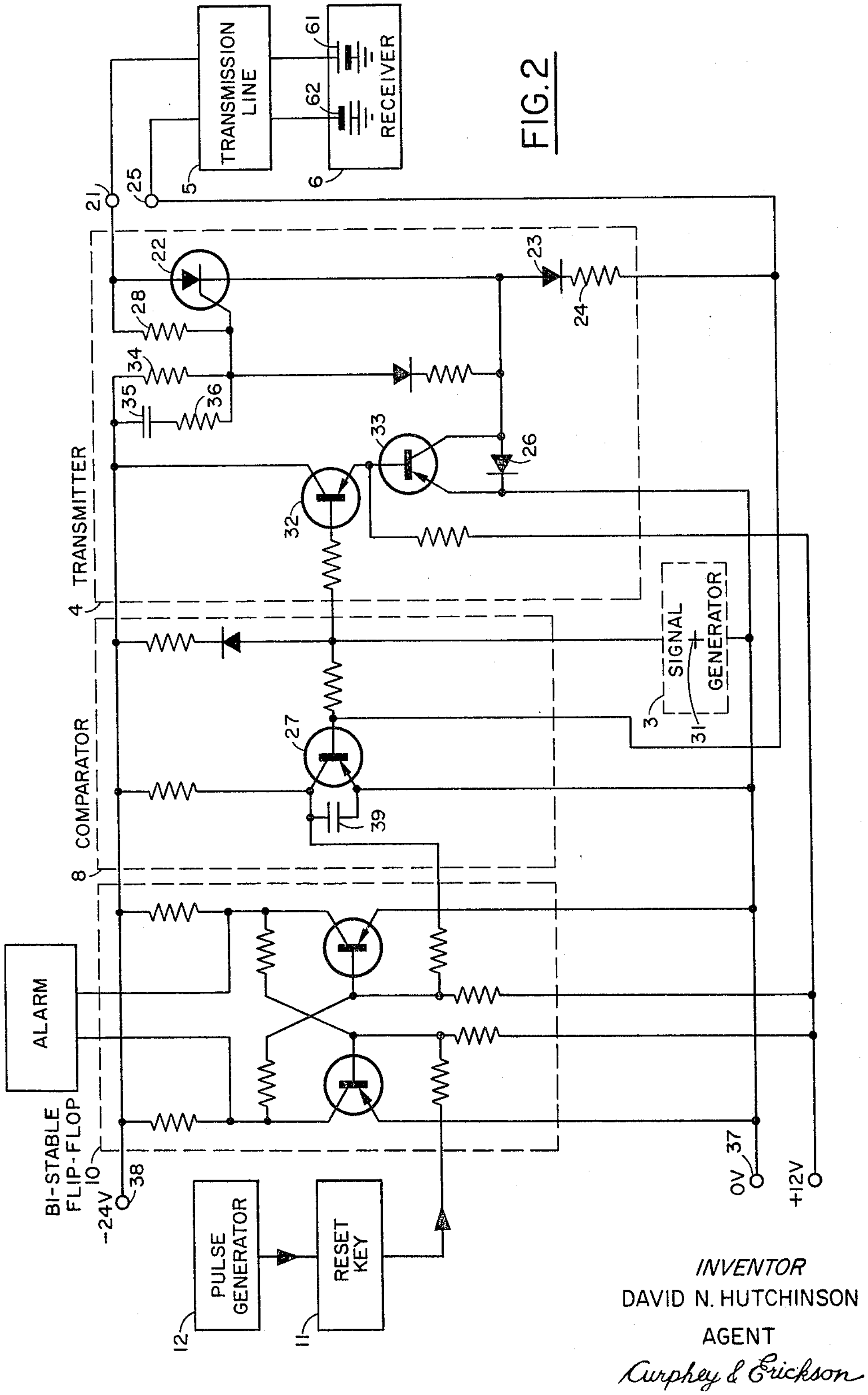
FIG. 2 shows the detailed connections of my invention.

Referring to FIG. 2, this shows the detailed connections and I will now describe their operation.

In the pulse condition, break contacts 31 of the signal generator 3 are open allowing the keying control circuit transistors 32 and 33 to conduct: current therefore flows from the source 37 through the emitter and collector of transistor 33, through the gate cathode of the silicon controlled rectifier 22 and resistor 34 to source 38 causing the silicon controlled rectifier 22 to cut off. With the silicon controlled rectifier 22 cut off, no current flows in the transmission line 5. Contacts 31 being open, transistor 27 is biased to saturation.

In the idle condition, current flows in the transmission line 5 from the positive battery 61 through terminal 21, the silicon controlled rectifier 22, diode 23, resistor 24, terminal 25, back through the transmission line 5, negative battery 62 and ground to the positive battery 61. The silicon controlled rectifier conducts due to the potential appearing at its cathode gate through resistor 28. The break contacts 31 of the signal generator 3 are closed and hold transistor 32 cut off which in turn holds transistor 33 cut off, so cutting off the current which held the silicon controlled rectifier non-conducting in the pulse condition. It will be noted that there is a potential drop across the diode 23 and resistor 24: this causes current to flow through the serial path comprising diode 26, and the emitter-base junction of transistor 27: the current is sufficient to cause saturation collector current to flow in transistor 27. Thus, no comparator output signal is generated.

Now when a break occurs in the transmission line, with the idle condition prevailing at the break contacts 31, the current flowing through diode 26 and the emitter-base junction of transistor 27 ceases. Collector current of transistor 27 is cut off generating a comparator output signal pulse which triggers the conventional bistable flip-flop 10 to its alarm state.

After clearing the transmission line break, the flip-flop is restored to its normal state by a pulse, from the pulse generator 12, applied through the reset key 11.

The capacitor 35 and resistor 36 form a pulse shaping network.

The capacitor 39 filters out pulses due to breaks of very short duration which do not affect the accuracy of transmission; it is not desirable to trigger the bastable flip-flop 10 to its alarm condition in such a case.

The foregoing description shows how I have constructed my transmission line break detecting circuit which is of much greater sensitivity than the prior art: my circuit may prove to be unnecessarily sensitive for certain present-day receivers in which case capacitor 39 may be adjusted to delay triggering of the bistable flop-flop 10 commensurate with sensitivity of the receiver.

What is claimed is:

1. In an electrical data transmission system, a transmission line break detecting circuit comprising:

(a) a signal generator, responsive to a data source for generating electrical signals representing the data;

(b) a transmission line;

(c) a transmitter, including a silicon controlled rectifier responsive to the signal generator for transmitting the electrical signals to the transmission line; and (d) a comparator, connected to the signal generator and to the transmission line, arranged to compare the electrical signals from the signal generator and from the transmission line, and to generate a comparator output signal if the electrical signals are different when no current is flowing in the transmission line.

2. In an electrical data transmission system, a transmission line break detecting circuit as defined in claim 1 wherein:

(a) the signal generator is arranged to open and close a pair of signal generator output contacts in response to the data source; and (b) the silicon controlled rectifier is connected to the signal generator output contacts by a control circuit.

3. In an electrical data transmission system, a transmission line break detecting circuit as defined in claim 2 wherein the control circuit comprises:

(a) a first transistor, responsive to the pair of signal generator output contacts; and (b) a second transistor, responsive to the first transistor, arranged to turn off the silicon controlled rectifier when the pair of signal generator output contacts are open.

4. In an electrical data transmission system, a transmission line break detecting circuit as defined in claim 1 wherein:

(a) the signal generator is arranged to open and close a pair of signal generator output contacts in response to the data source; and (b) the comparator comprises a transistor, arranged to be held in the conducting state by either a current flowing in the transmission line or opening of the pair of signal generator output contacts, and arranged to cut-off when no current flows in the transmission line at the same time as the pair of signal generator output contacts are closed, and also arranged to generate a comparator output signal as said transistor is cut off.

5. In an electrical data transmission system, a transmission line break detecting circuit comprising:

(a) a signal geneartor responsive to a data source for generating electrical signals representing the data by opening and closing a pair of signal generator output contacts;

(b) a transmission line;

(c) a transmitter, for transmitting the electrical signals to the transmission line, comprising a silicon controlled rectifier connected to the pair of signal generator output contacts by a first transistor responsive to the pair of signal generator output contacts, and a second transistor, responsive to the first transistor, arranged to turn off the silicon controlled rectifier when the pair of signal generator output contacts are open; and (d) a comparator, including a third transistor arranged to be held in the conducting state by either a current flowing in the transmission line or opening of the pair of signal generator output contacts, and arranged to cut off when no current flows in the transmission line at the same time as the pair of signal generator output contacts are closed, and also arranged to generate a comparator output signal as the third transistor is cut off.

References Cited by the Examiner

UNITED STATES PATENTS

| | | | |
|---|---|---|---|
| 3,020,529 | 2/1962 | Turner | 340—253 |
| 3,056,856 | 10/1962 | Lamin et al. | 178—69 |
| 3,133,275 | 5/1964 | Cohrt et al. | 178—69 |

NEIL C. READ, *Primary Examiner.*

THOMAS B. HABECKER, *Examiner.*

T. A. ROBINSON, *Assistant Examiner.*